(12) United States Patent
Bruner et al.

(10) Patent No.: US 7,996,899 B1
(45) Date of Patent: Aug. 9, 2011

(54) COMMUNICATION SYSTEMS AND METHODS FOR DIGITAL CONTENT MODIFICATION AND PROTECTION

(75) Inventors: Curtis H. Bruner, Longmont, CO (US); Christopher J. Squires, Westminster, CO (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1205 days.

(21) Appl. No.: 11/361,471

(22) Filed: Feb. 24, 2006

(51) Int. Cl.
 *G06F 21/00* (2006.01)
(52) U.S. Cl. ............ 726/23; 380/29; 380/30; 380/44; 380/45; 380/46; 713/189; 713/190; 713/191; 713/192; 713/193
(58) Field of Classification Search ............... 380/29, 380/30, 44, 45, 46, 47, 277; 713/189, 190, 713/191, 192, 193, 194, 165; 726/23
See application file for complete search history.

(56) References Cited

U.S. PATENT DOCUMENTS

| | | | |
|---|---|---|---|
| 3,916,112 A | 10/1975 | Kalat et al. | |
| 5,388,156 A | 2/1995 | Blackledge, Jr. et al. | |
| 5,461,674 A | 10/1995 | Citta | |
| 5,721,778 A | 2/1998 | Kubota et al. | |
| 5,768,372 A | 6/1998 | Sung et al. | |
| 5,818,873 A | 10/1998 | Wall et al. | |
| 5,854,938 A | 12/1998 | Ogi | |
| 5,870,475 A * | 2/1999 | Allan et al. | 380/282 |
| 5,925,144 A | 7/1999 | Sebaa | |
| 5,949,877 A | 9/1999 | Traw et al. | |
| 5,982,899 A | 11/1999 | Probst | |
| 6,012,146 A | 1/2000 | Liebenow | |
| 6,229,712 B1 | 5/2001 | Munoz-Bustamante et al. | |
| 6,252,961 B1 | 6/2001 | Hogan | |
| 6,601,175 B1 | 7/2003 | Arnold et al. | |
| 6,668,246 B1 | 12/2003 | Yeung et al. | |
| 6,895,504 B1 | 5/2005 | Zhang et al. | |
| 6,918,036 B1 | 7/2005 | Drews | |
| 7,313,824 B1 | 12/2007 | Bala et al. | |
| 7,353,542 B2 | 4/2008 | Shiga et al. | |
| 7,487,363 B2 | 2/2009 | Alve et al. | |
| 7,502,470 B2 | 3/2009 | Hanko et al. | |
| 2002/0044657 A1 | 4/2002 | Asano et al. | |
| 2002/0141578 A1 | 10/2002 | Ripley et al. | |

(Continued)

FOREIGN PATENT DOCUMENTS

EP 0593305 4/1994

OTHER PUBLICATIONS

Microsoft; Trusted Platform Module Services in Windows Longhorn; Apr. 25, 2005; WinHEC 2005 Version.

(Continued)

*Primary Examiner* — Vivek Srivastava
*Assistant Examiner* — Thong Truong

(57) ABSTRACT

A communication system comprises a content provider system configured to receive a content request indicating content and a device identifier, determine a first key based on the device identifier, process the content using the first key to modify the content from an unprotected state to a protected state, and transfer the content in the protected state. The communication system further comprises an end user system configured to receive the content in the protected state and process the content with a second key to modify the content from the protected state to an unprotected state wherein the second key is internally hard coded to the end user system.

16 Claims, 20 Drawing Sheets

U.S. PATENT DOCUMENTS

| | | |
|---|---|---|
| 2003/0084316 A1 | 5/2003 | Schwartz |
| 2003/0120918 A1 | 6/2003 | VanDer Kamp |
| 2003/0161473 A1* | 8/2003 | Fransdonk .................... 380/277 |
| 2003/0174844 A1 | 9/2003 | Candelore |
| 2003/0202199 A1 | 10/2003 | Carter et al. |
| 2003/0212911 A1 | 11/2003 | Challener et al. |
| 2004/0111613 A1* | 6/2004 | Shen-Orr et al. ............. 713/165 |
| 2004/0172369 A1 | 9/2004 | Persson |
| 2004/0181303 A1 | 9/2004 | Walmsley |
| 2004/0250104 A1 | 12/2004 | Handa et al. |
| 2005/0033972 A1 | 2/2005 | Watson |
| 2005/0108525 A1 | 5/2005 | Nason et al. |
| 2006/0242068 A1 | 10/2006 | Jogand-Coulomb et al. |
| 2007/0106842 A1 | 5/2007 | Conley et al. |
| 2007/0168292 A1 | 7/2007 | Jogand-Coulomb et al. |
| 2007/0168564 A1 | 7/2007 | Conley et al. |

OTHER PUBLICATIONS

Sundeep Bajikar; Trusted Platform Module (TPM) based Security on Notebook PCs—White Paper; Jun. 20, 2002; Mobile Platforms Group Intel Corporation.

USPTO Office Action Summary from U.S. Appl. No. 11/361,510 mailed Oct. 27, 2010.

* cited by examiner

COMMUNICATION SYSTEMS AND METHODS FOR DIGITAL CONTENT MODIFICATION AND PROTECTION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of digital content protection, and in particular, digital content modification using a key hard coded internally to an end user system to protect digital content.

2. Description of the Prior Art

Content providers and end users alike have become increasingly concerned with the issue of digital content protection and digital rights management. In the prior art, software and hardware based encryption methods have been implemented in end user systems to protect digital content and manage digital rights. Examples of end user systems include, for example, personal computers, mobile computing and communication devices, music and video devices, mobile phones, personal digital assistants, as well as other types of end user systems.

One way in which content providers desire to manage digital content is to limit content to particular devices or end user systems. Problematically, most prior art digital content protection technologies lack the ability to link digital content to particular end user systems. For instance, many prior art cryptographic processes use software based keys to decrypt encrypted content. Due to the ease with which software based keys are distributed, encrypted content can be downloaded and decrypted to any number of devices, regardless of the concerns of a content provider.

SUMMARY OF THE INVENTION

The above problems and other problems are solved by providing an end user system having an internally hard coded key. In this manner, a remote modification process initially places digital content in a protected state. The content is then transferred to an end user system and returned to an unprotected and useful state using another modification process and the hard coded key. By hard coding the key internally to an end user system, content is physically linked to the particular end system that contains a key capable of returning the content from a protected state to an unprotected state.

In an embodiment, a communication system comprises a content provider system configured to receive a content request indicating content and a device identifier, determine a first key based on the device identifier, process the content using the first key to modify the content from an unprotected state to a protected state, and transfer the content in the protected state. The communication system further comprises an end user system configured to receive the content in the protected state and process the content with a second key to modify the content from the protected state to an unprotected state wherein the second key is internally hard coded to the end user system.

In an embodiment, the end user system transmits the content request to the content provider system and wherein the device identifier is internally hard coded to the end user system.

In an embodiment, the first key comprises a public key and the second key comprises a private key corresponding to the public key.

In an embodiment, the content provider system compresses the content, modifies the content to a protected state after compressing the content, and transfers the content in the protected state to the end user system.

In an embodiment, the end user system processes the content with the second key to modify the content from the protected state to the unprotected state and decompresses the content after modifying the content from the protected state to the unprotected state.

In an embodiment, the content provider system modifies the content to the protected state, compresses the content after modifying the content to the protected state, and transfers the content in the protected state to the end user system.

In an embodiment, the end user system decompresses the content and modifies the content from the protected state to the unprotected state after decompressing the content.

In an embodiment, the protected state comprises an encrypted state and wherein the unprotected state comprises an unencrypted state.

In an embodiment, a method of operating a communication system comprises in a content provider system receiving a content request indicating content and a device identifier, determining a first key based on the device identifier, processing the content using the first key to modify the content from an unprotected state to a protected state, and transferring the content in the protected state. The method further comprises in an end user system receiving the content in the protected state and processing the content with a second key to modify the content from the protected state to an unprotected state wherein the second key is internally hard coded to the end user system.

BRIEF DESCRIPTION OF THE DRAWINGS

The same reference number represents the same element on all drawings.

DETAILED DESCRIPTION OF THE PREFERRED EMBODIMENT

FIGS. 1-20 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
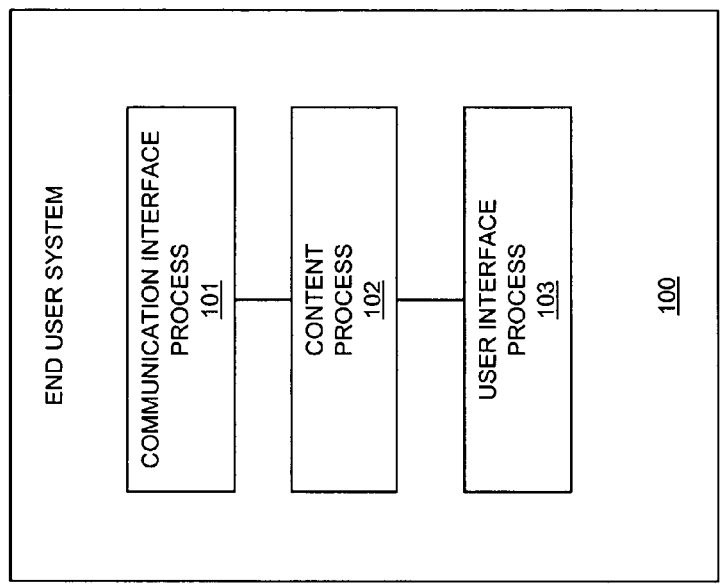
FIG. 1 illustrates an end user system in an embodiment of the invention.

FIG. 1 illustrates a functional block diagram of an end user system 100 in an embodiment. End user system 100 could comprise a system or collection of systems. For example, end user system 100 could comprise a device, such as a mobile phone, personal computer, video player, audio player, or personal digital assistant, as well as other types of devices. End user system 100 could also comprise multiple devices networked devices, such as a video or audio player coupled with a personal computer. Other examples of multiple networked devices are possible.

In this embodiment, end user system 100 includes communication interface process 101, content process 102, and user interface process 103. Communication interface process 101 is linked to content process 102. Content process 102 is linked to user interface process 103. Communication interface process 101 could be any process capable of interfacing communications between content process 102 and external entities, such as a remote content source. Content process 102 could be any process capable of interfacing with communication interfacing process 101 and user interface process 103. In addition, content process 102 could be any process capable of modifying digital content. Digital content could comprise any type of content provided in a digital form. For example, digital content could comprise video, audio, text, or graphics content, as well as other types of digital content. User interface process 103 could be any process capable of interfacing with content process 102, as well as with external entities, such as a user.

Figure 2:
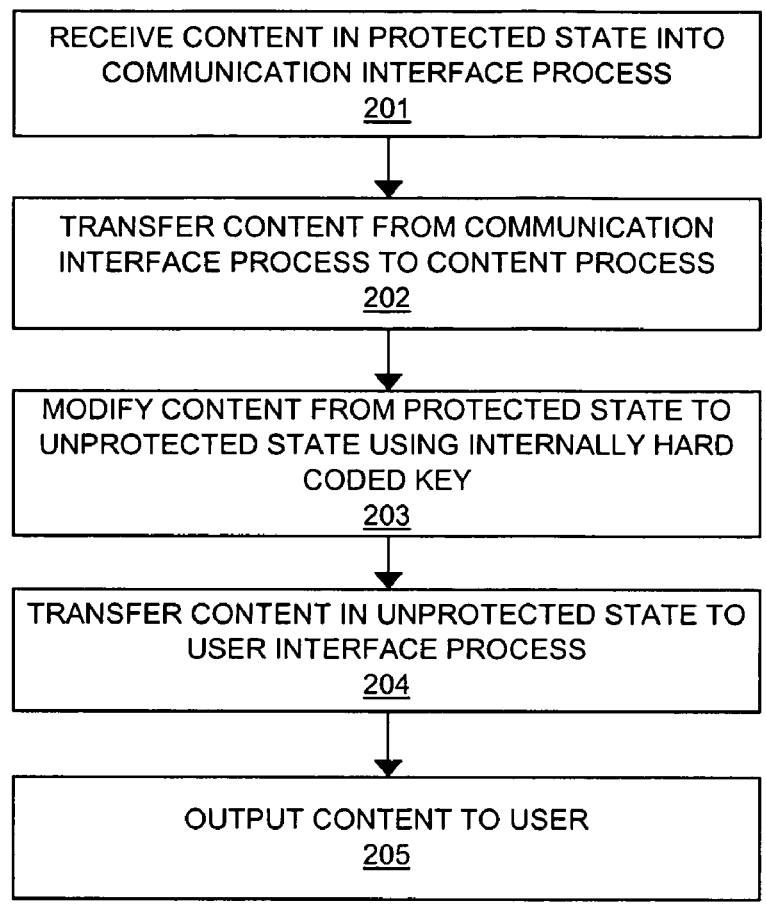
FIG. 2 illustrates the operation of an end user system in an embodiment of the invention.

FIG. 2 illustrates the operation of end user system 100 in an embodiment of the invention. To begin, communication interface process 101 receives digital content in a protected state (Step 201). The content could be received from, for example, a remote source. Next, communication interface process 101 transfers the content in the protected state to content process 102 (Step 202). Content process 102 processes the content with an internally hard coded key to modify the content from the protected state to an unprotected state (Step 203). In the protected state, the content could be encrypted, encoded, or both. In the decrypted state, the content could be decrypted, decoded, or both. Upon modifying the content, the content is transferred in its unprotected state to user interface process 103 (Step 204). User interface process 103 provides the content in a useful form, such as an audio or video form, to a user.

It should also be understood that, in an embodiment, end user system 100 could include a discrimination process capable of determining whether or not content requires modification from a protected state to an unprotected state. For example, some types of content could arrive in an unprotected state. In such a case, the modification process could be bypassed. In another example, it could be unknown whether or not the content is in a protected or unprotected state. In such a case, the discrimination process could proceed with a check process to determine the state of the content. Depending upon the result of the check process, the content could be either passed to a modification process or the modification process could be bypassed. In one example, the content state could be indicated by a flag imbedded in the content. In another example, the content state could be derived from the source of the content. For instance, some content providers could be assumed by the check process to always transmit content in a protected state, while other content providers could be assumed to always transmit content in an unprotected state. In another example, the content state could be indicated by a control message transmitted to end user system 100 along with the content.

Figure 3:
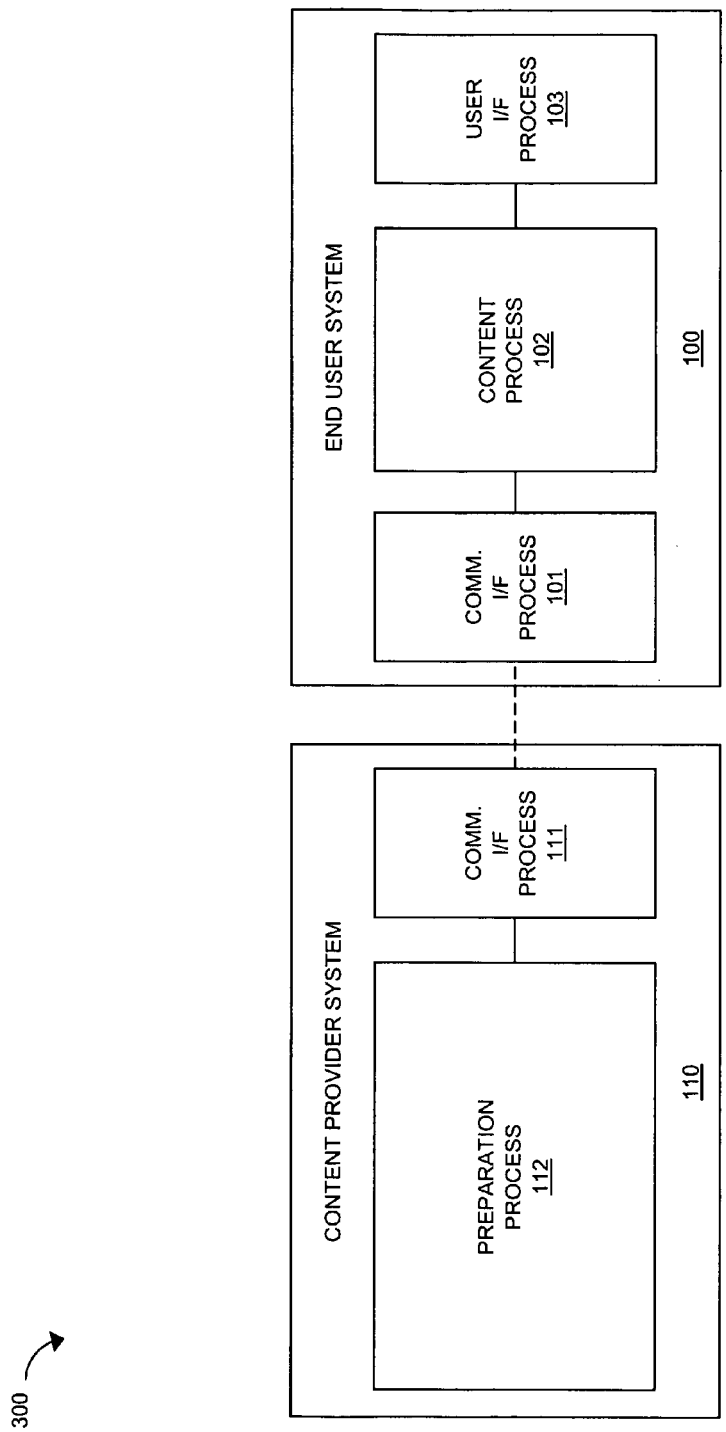
FIG. 3 illustrates a communication system in an embodiment of the invention.

FIG. 3 illustrates communication system 300 in an embodiment. In this embodiment, communication system 300 includes content provider system 110 in communication with end user system 100. Content provider system 110 could communicate with end user system 100 over a network, as is well known in the art. Content provider system 110 could be any computing system capable of preparing and providing content to end user system 100. For example, content provider system 110 could be a web server, a content server, or a combination of both, as well as other types of well known content provider systems. Content provider system 110 includes preparation process 112 and communication interface process 111. Preparation process 112 could be any process capable of preparing digital content for transfer by communication interface process 111 to end user system 100. Communication interface process 111 could be any process capable of interfacing between preparation process 112 and communication interface process 101.

Figure 4:
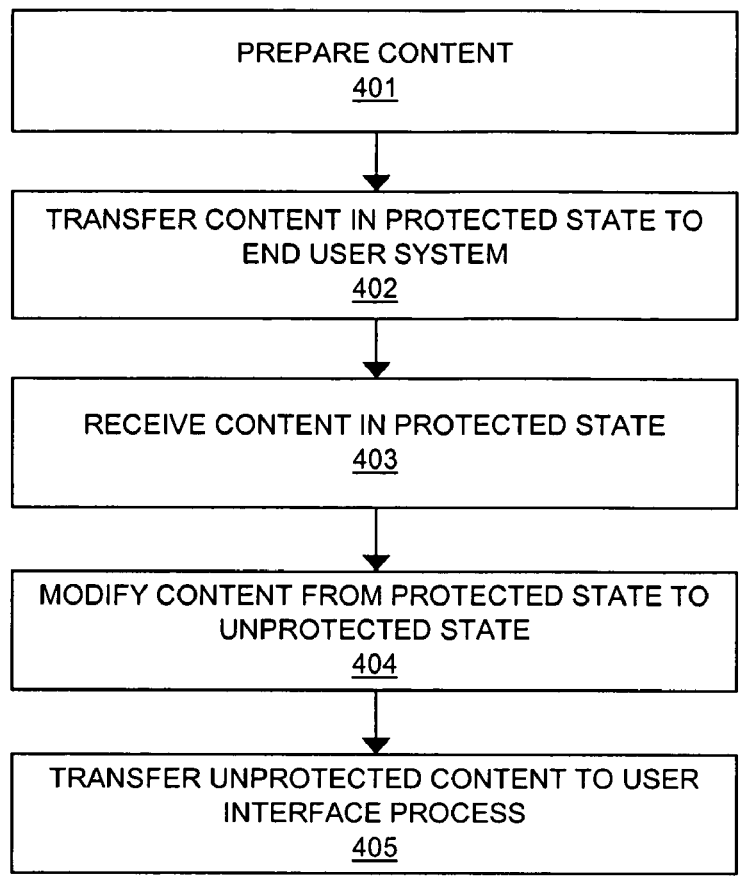
FIG. 4 illustrates the operation of a communication system in an embodiment of the invention.

FIG. 4 illustrates the operation of communication system 300 in an embodiment. To begin, preparation process 112 prepares digital content for transfer to end user system 100 (Step 401). For example, preparation process 112 could process the content to place the content in a protected state. Next, communication interface process 111 transfers the content in a protected state to end user system 100 (Step 402). Communication interface process 101 receives the content in the protected state (Step 403) and transfers the content to content process 102. Content process 102 processes the content using the internally hard coded key to modify the content from the protected state to an unprotected state (Step 404). Upon modifying the content, content process 102 transfers the content in the unprotected state to user interface process 103 (Step 405). User interface process 103 provides the content in a useful form to a user.

In one embodiment, content process 102 could be the last process to operate on the digital content prior to the content being converted from a digital form to an analog form suitable for output to a user. For example, upon being modified by content process 102, the content could be transferred on a digital data bus to user interface process 103. User interface process 103 could convert the digital data in its unprotected state to an analog form for output to a user. It should also be understood that the modification process executed within content process 102 could be performed within user interface process 103. As part of the conversion process from digital to analog form, user interface process 103 could modify the digital content from a protected state to an unprotected state.

It should also be understood that other intermediate processes could occur between communication interface process 101 and content process 102. For example, a storage process could store the content on a local storage device, such as a hard drive or flash memory device. In one example, the content could be stored in its protected state and later retrieved from storage and processed by the other intermediate processes prior to content process 102.

Advantageously, end user system 100 links digital content to a particular end system by providing a content process 102 that modifies protected content to an unprotected state utilizing an internally hard coded key. In this manner, content can be protected remotely, transferred to end user system 100, and processed using the key to modify the content to an unprotected and useful state for output by user interface process 103.

Figure 5:
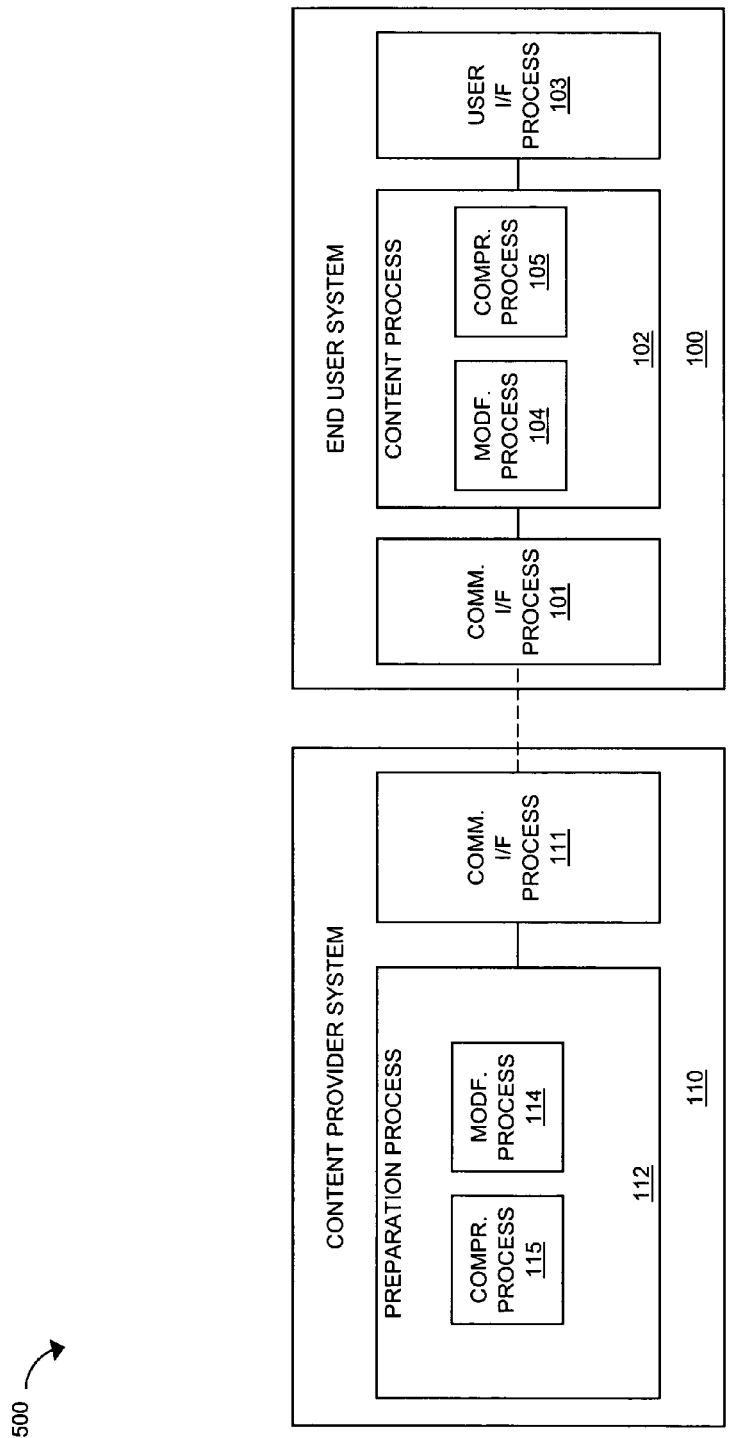
FIG. 5 illustrates a communication system in an embodiment of the invention.

FIG. 5 illustrates communication system 500 in an embodiment. Communication system 500 includes end user system 100 and content provider system 110. In this embodiment, content process 102 includes modification process 104 and compression process 105. In addition, preparation process includes compression process 115 and modification process 114. Compression process 115 could be any process capable of compression digital content, such as an audio or video compression process. Compression process 105 could be any process capable of decompression digital content. Compression/decompression processes are well known in the art. Modification process 114 could be any process capable of modifying content to a protected state from an unprotected state. It should be understood that modification process 114 could be incorporated with compression process 115. Modification process 104 could be any process capable of modifying protected content to an unprotected state. Modification processes 104 and 114 could be, for example, cryptographic processes. Modification process 104 could use an internally hard coded key as a cryptographic key or seed. It should be understood that compression process 104 could be incorporated with compression process 105.

Figure 6:
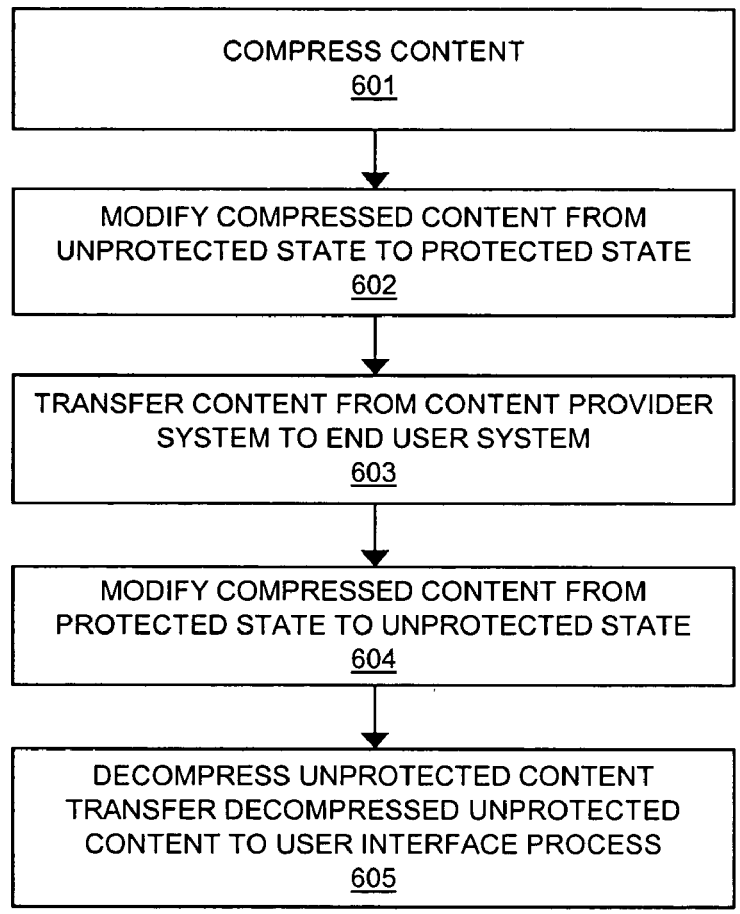
FIG. 6 illustrates the operation of a communication system in an embodiment of the invention.

FIG. 6 illustrates the operation of communication system 500 in an embodiment if the invention. To begin, compression process 115 within preparation process 112 compresses digital content and passes the compressed content to modification process 114 (Step 601). Modification process 114 processes the compressed content to place the content in a protected state (Step 602). For example, modification process 114 could encrypt the compressed content. Modification process 114 passes the protected and compressed content to communication interface process 111 and, in turn, communication interface process 111 transfers the content to communication interface process 101 (Step 603). Communication interface process 101 transfers the protected and compressed content to modification process 104. Modification process 104 processes the content with the key to modify the content to an unprotected state (Step 604). At this point, the content remains in a compressed form. Next, compression process 105 decompresses the content and passes the unprotected content to user interface process 103 (Step 605).

It should be understood that modification processes 114 and 104 could comprise any type of process capable of modifying content to a protected state and reverse-modifying the content to an unprotected state. In one example, modification process 114 could comprise an exclusive-or (XOR) process. In such an example, the content is XORed with a key to produce the modified and protected content. Furthermore, modification process 104 could also comprise an exclusive-or (XOR) process. In such a case, the protected content is XORed with the internally hard coded key to return the content to its original unprotected state. Other modification processes are possible.

Figure 7:
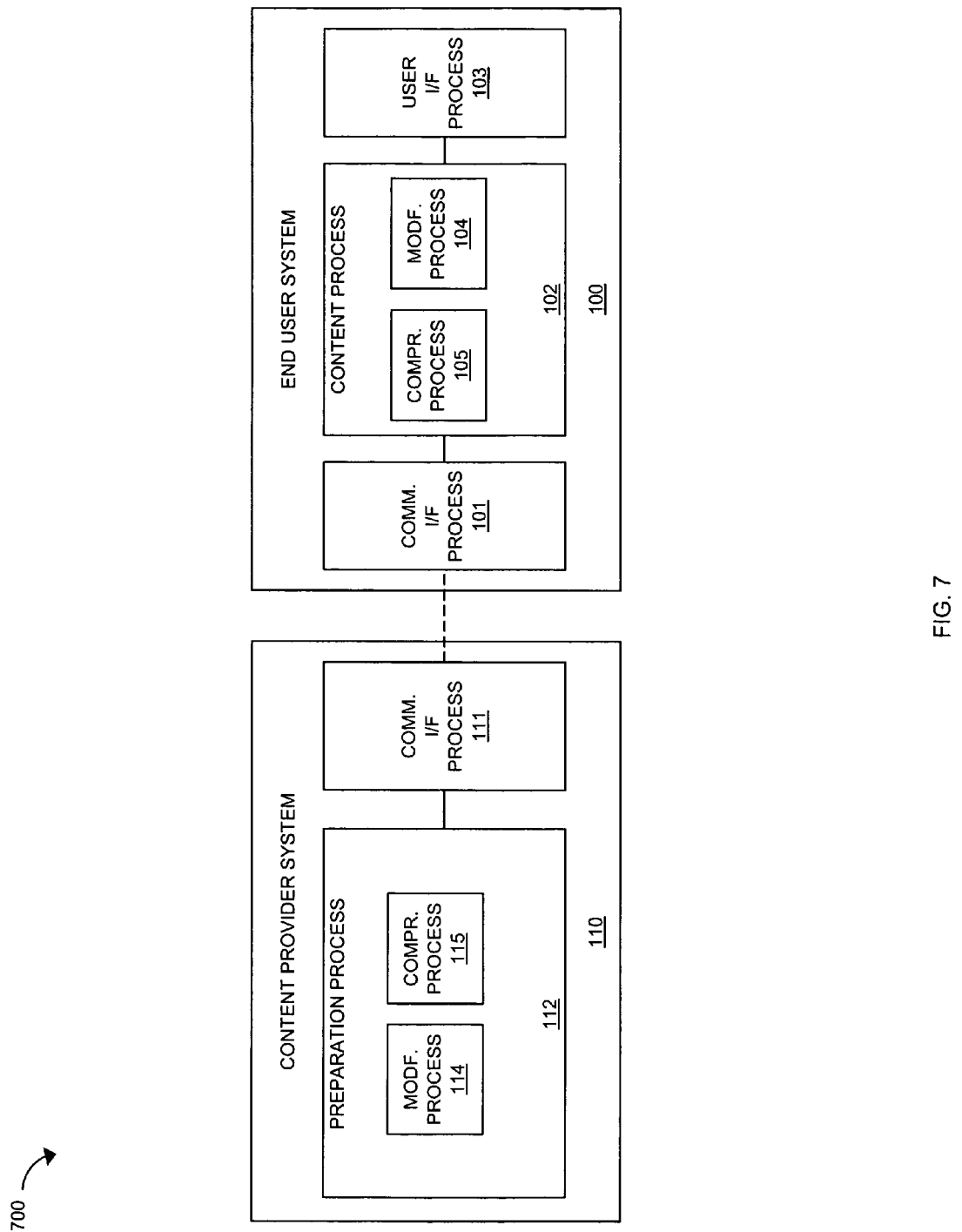
FIG. 7 illustrates a communication system in an embodiment of the invention.

FIG. 7 illustrates communication system 700 in an embodiment. In this embodiment, communication system 700 includes end user system 100 and content provider system 112. In a departure from FIG. 5, the order of compression process 105 and modification process 104 is reversed. In addition, the order of modification process 114 and compression process 115 is reversed.

Figure 8:
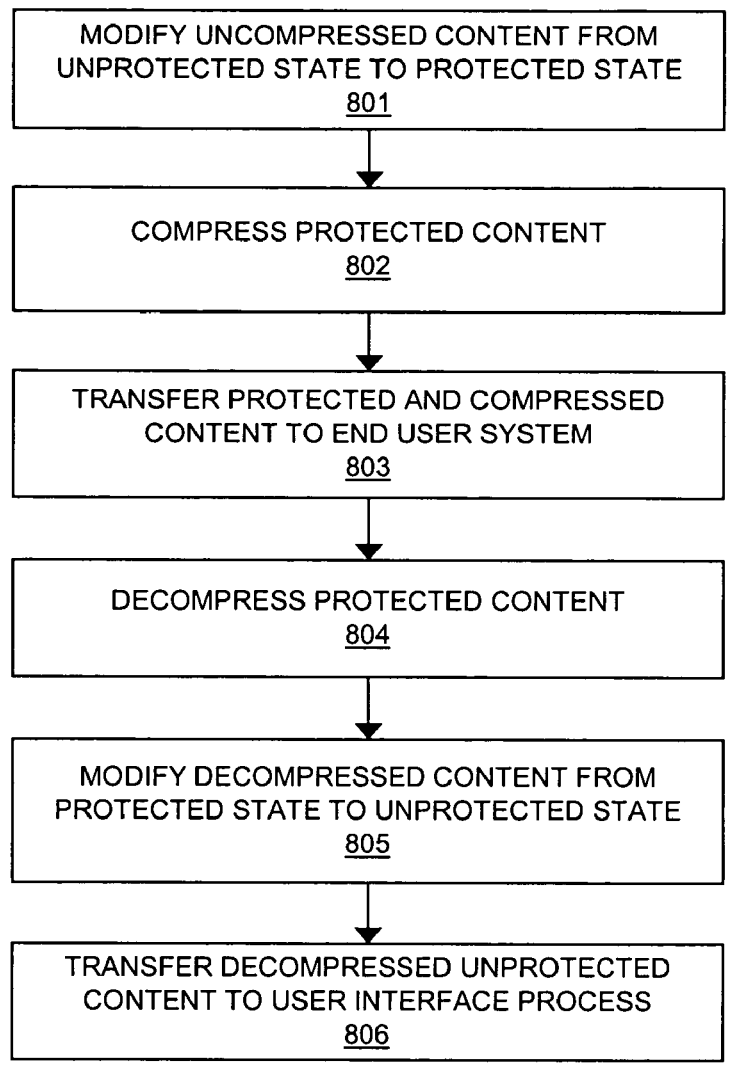
FIG. 8 illustrates the operation of a communication system in an embodiment of the invention.

FIG. 8 illustrates the operation of communication system 700 in an embodiment if the invention. To begin, modification process 114 processes digital content to place the content in a protected state (Step 801). For example, modification process 114 could encrypt the content. Next, compression process 115 compresses the protected content (Step 802). The content is then passed to communication interface process 111 and, in turn, communication interface process 111 transfers the content to communication interface process 101 (Step 803). Communication interface process 101 transfers the protected and compressed content to compression process 105. Compression process 105 decompresses the protected content (Step 804) and passes the content to modification process 104. Modification process 104 processes the decompressed content with the key to modify the content to an unprotected state (Step 805). Lastly, the content is passed in its unprotected state to user interface process 103 (Step 806).

Figure 9:
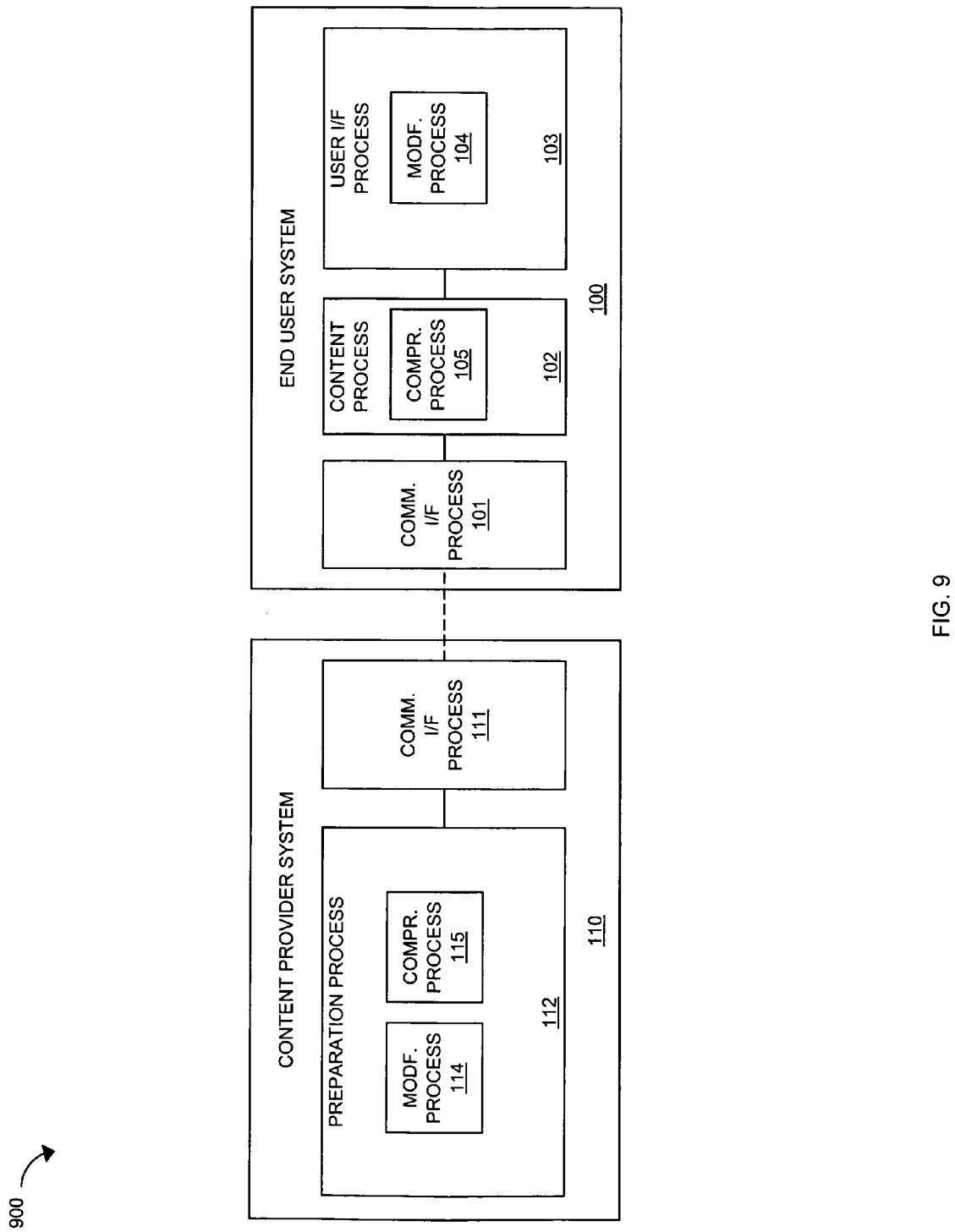
FIG. 9 illustrates a communication system in an embodiment of the invention.

FIG. 9 illustrates communication system 900 in an embodiment. Communication system 900 includes end user system 100 and content provider system 110. In this embodiment, content process 102 includes compression process 105. In a departure, user interface process 103 includes modification process 104.

Figure 10:
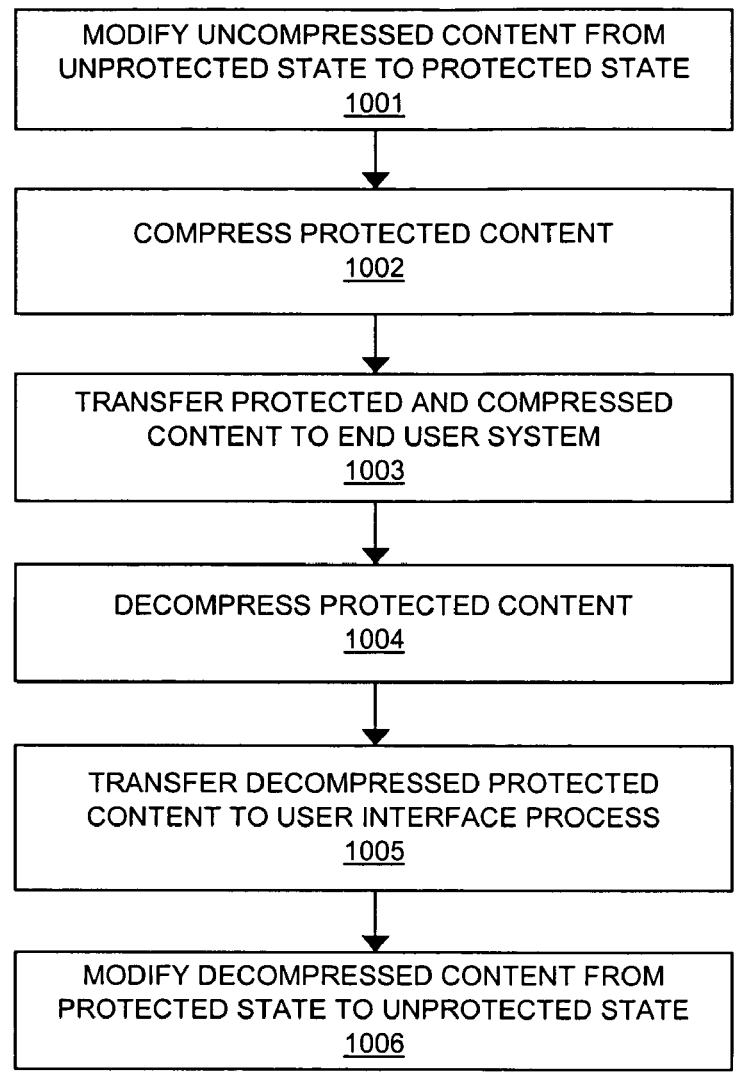
FIG. 10 illustrates the operation of a communication system in an embodiment of the invention.

FIG. 10 illustrates the operation of communication system 900 in an embodiment. To begin, modification process 114 processes digital content to place the content in a protected state (Step 1001). For example, modification process 114 could encrypt the content. Next, compression process 115 compresses the protected content (Step 1002). The content is then passed to communication interface process 111 and, in turn, communication interface process 111 transfers the content to communication interface process 101 (Step 1003). Communication interface process 101 transfers the protected and compressed content to compression process 105 within content process 102. Compression process 105 decompresses the protected content (Step 1004) and passes the content to user interface process 103 (Step 1005). Within user interface process 103, modification process 104 processes the decompressed content with the key to modify the content from its protected state to an unprotected state (Step 1006). For example, modification process 114 could decrypt the content. Lastly, the content is output to a user.

Figure 11:
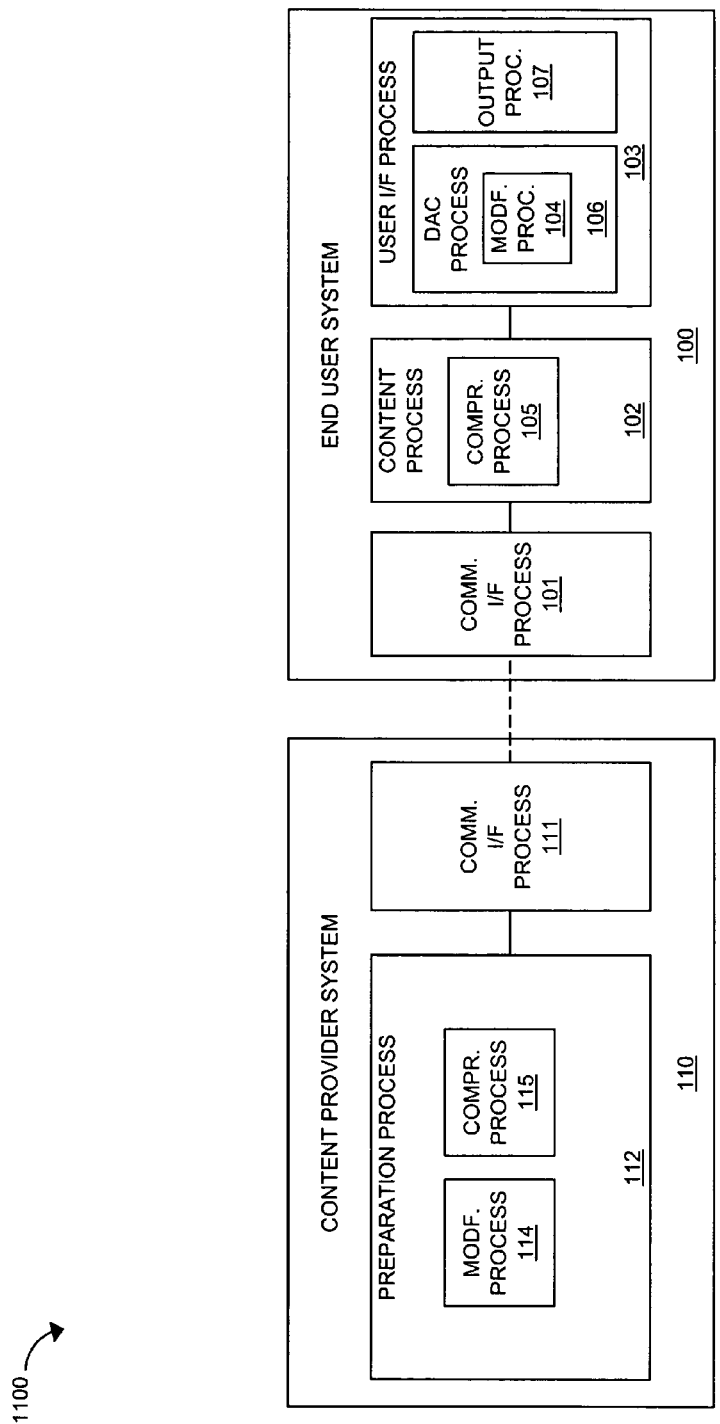
FIG. 11 illustrates a communication system in an embodiment of the invention.

FIG. 11 illustrates communication system 1100 in an embodiment of the invention. In this embodiment, user interface process 101 includes a digital-analog conversion (DAC)

process 106 and an output process 107. Further in this embodiment, DAC process 106 includes modification process 104. DAC process 106 could be any process capable of converting digital content to an analog form. Output process 107 could be any process capable of outputting content in an analog form.

Figure 12:
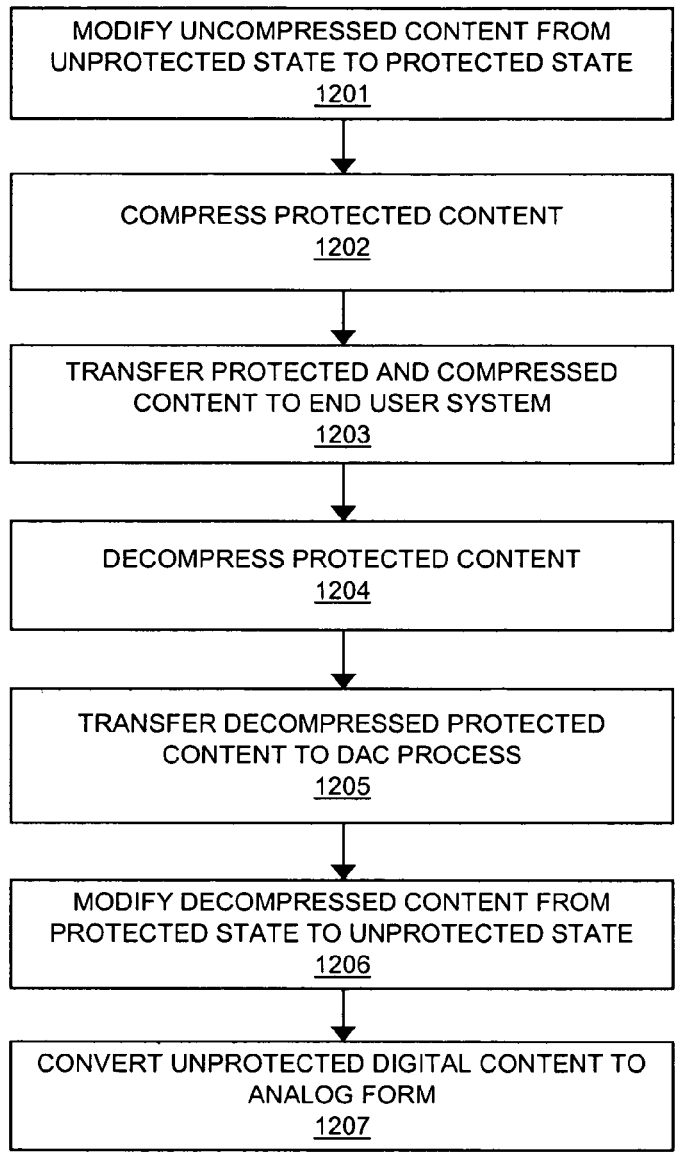
FIG. 12 illustrates the operation of a communication system in an embodiment of the invention.

FIG. 12 illustrates the operation of communication system 1100 in an embodiment of the invention. Modification process 114 processes digital content to place the content in a protected state (Step 1201). For example, modification process 114 could encrypt the content. Next, compression process 115 compresses the protected content (Step 1202). The content is then passed to communication interface process 111 and, in turn, communication interface process 111 transfers the content to communication interface process 101 (Step 1203). Communication interface process 101 transfers the protected and compressed content to compression process 105 within content process 102. Compression process 105 decompresses the protected content (Step 1204) and passes the content to user interface process 103 (Step 1205). Within user interface process 103, the content is passed to DAC process 106 to convert the decompressed digital content to an analog form. Within DAC process 106, modification process 104 processes the content with the key to modify the content from its protected state to an unprotected state (Step 1206). For example, modification process 114 could decrypt the content. In this example, the key could be an internally hard coded key. However, it should be understood that the key need not be an internally hard coded key. DAC process 106 converts the unprotected digital content to an analog form (Step 1207) and passes the analog content to output process 107. Output process 107 outputs the content to a user.

Figure 13:
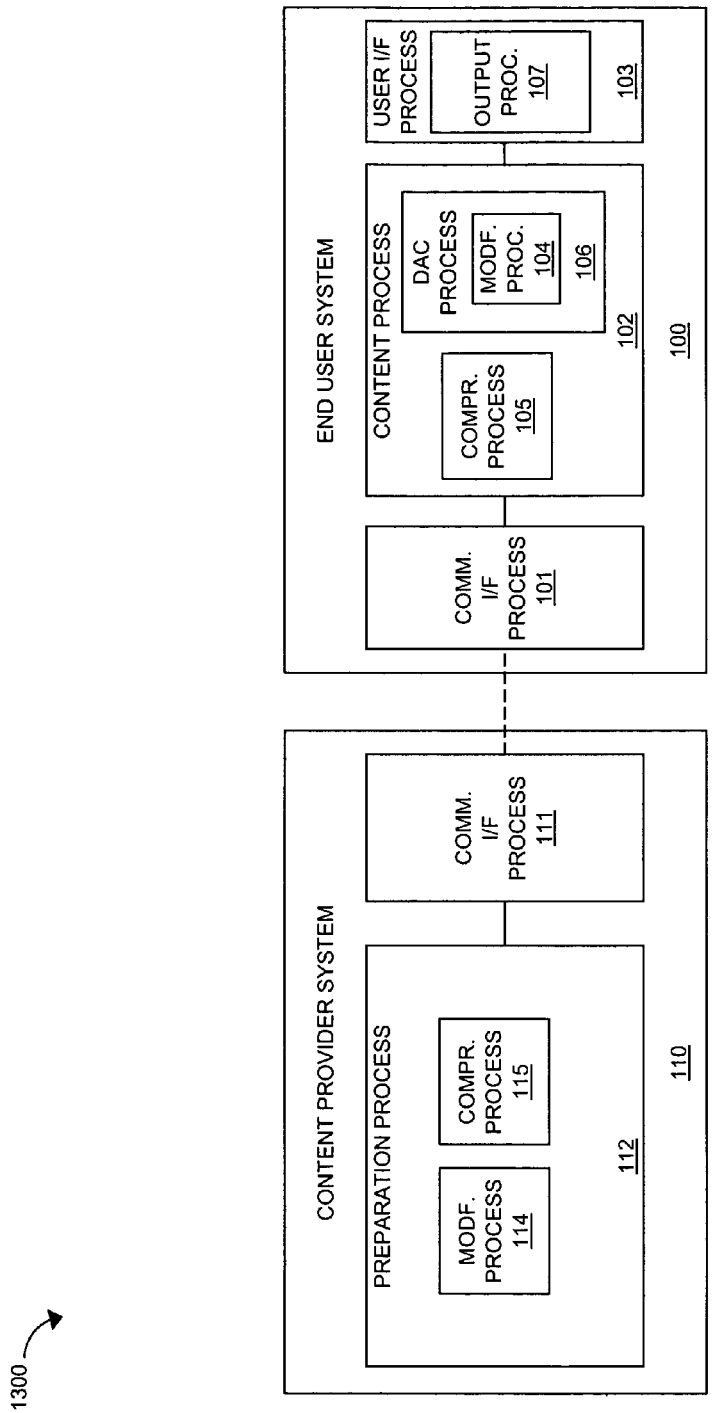
FIG. 13 illustrates a communication system in an embodiment of the invention.

FIG. 13 illustrates communication system 1300 in an embodiment of the invention. In a departure from communication system 1100, content process 102 includes compression process 105, DAC process 106, and modification process 104. User interface process includes output process 107.

Figure 14:
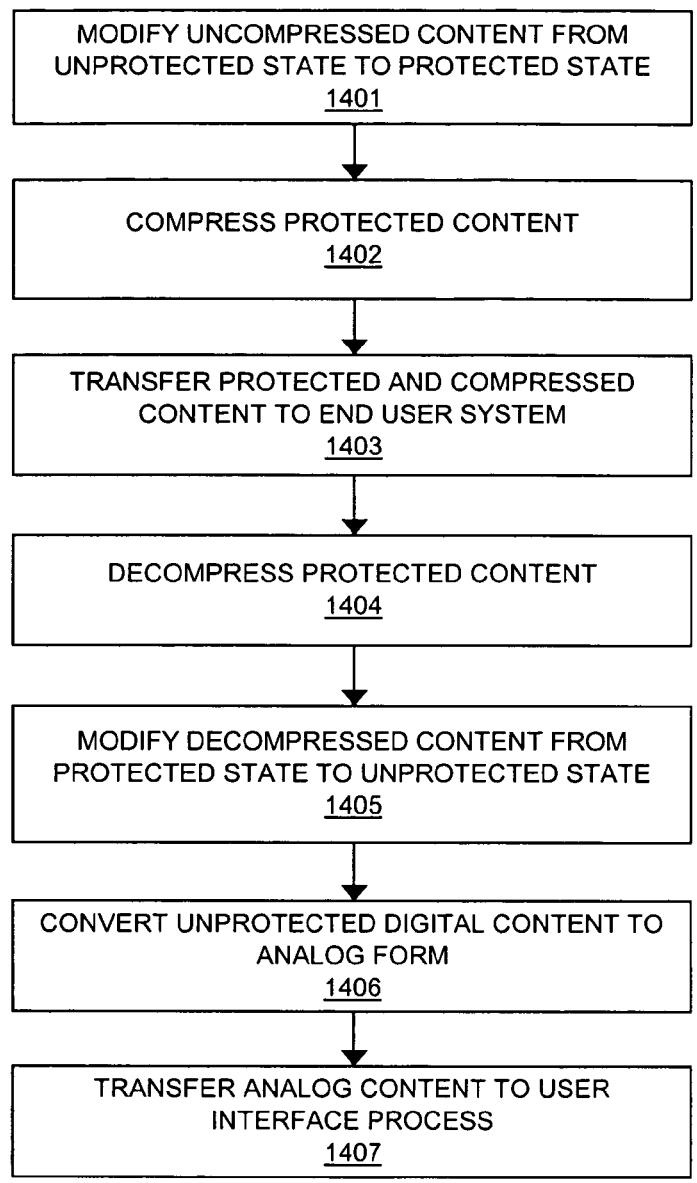
FIG. 14 illustrates the operation of a communication system in an embodiment of the invention.

FIG. 14 illustrates the operation of communication system 1300 in an embodiment of the invention. To begin, modification process 114 processes digital content to place the content in a protected state (Step 1401). For example, modification process 114 could encrypt the content. Next, compression process 115 compresses the protected content (Step 1402). The content is then passed to communication interface process 111 and, in turn, communication interface process 111 transfers the content to communication interface process 101 (Step 1403). Communication interface process 101 transfers the protected and compressed content to compression process 105 within content process 102. Compression process 105 decompresses the protected content (Step 1404) and passes the content to DAC process 106 to convert the decompressed digital content to an analog form. Within DAC process 106, modification process 104 processes the content with the key to modify the content from its protected state to an unprotected state (Step 1405). For example, modification process 114 could decrypt the content. In this example, the key could be an internally hard coded key. However, it should be understood that the key need not be an internally hard coded key. DAC process 106 converts the unprotected digital content to an analog form (Step 1406) and passes the analog content to user interface process 103 (Step 1407). Output process 107 outputs the content to a user.

Figure 15:
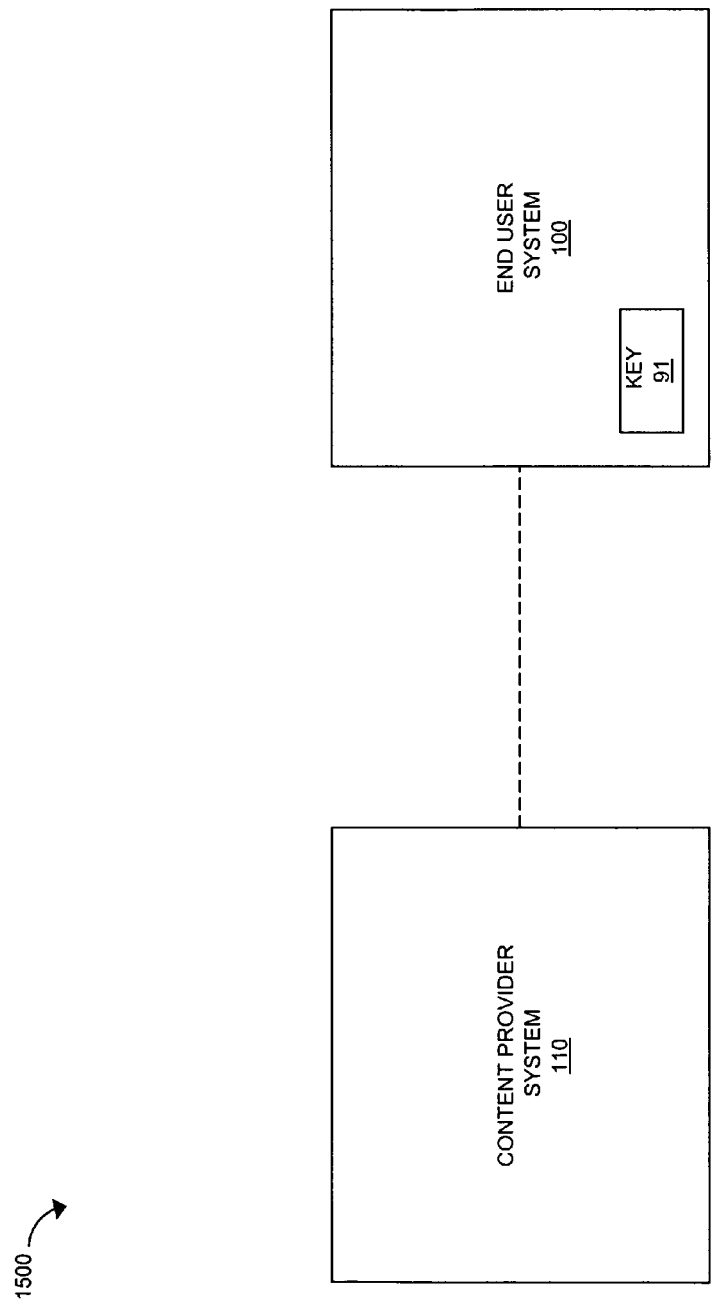
FIG. 15 illustrates a communication system in an embodiment of the invention.

FIG. 15 illustrates communication system 1500 in an embodiment. Communication system 1500 includes end user system 100 and content provider system 110. End user system 100 includes key 91. In this embodiment, key 91 is internally hard coded to end system 100. End user system 100 is in communication with content provider system 110.

Figure 16:
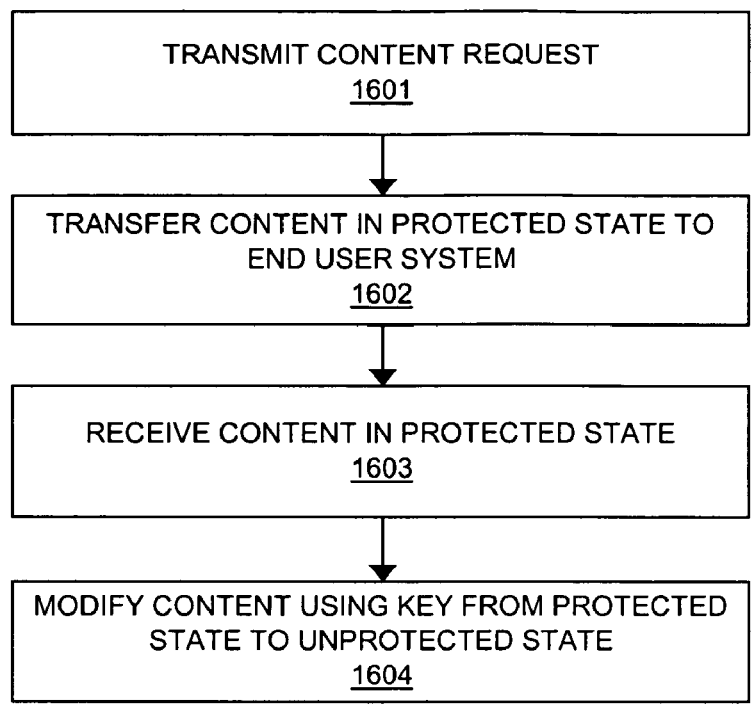
FIG. 16 illustrates the operation of a communication system in an embodiment of the invention.

FIG. 16 illustrates the operation of communication system 1500 in an embodiment. In this embodiment, end user system 100 transmits a content request to content provider system 110 (Step 1601). The content request could indicate, for example, specific content, such as a song, a video, a file, or the like. Content provider system 110 transfers the content in a protected state to end user system 100 (Step 1602) in response to the content request. In one example, the content could be encrypted. End user system 100 receives the content in its protected state (Step 1603). End user system 100 processes the content along with key 91 to modify the content from the protected state to an unprotected state. In one example, end user system 100 could decrypt the content with key 91.

Figure 17:
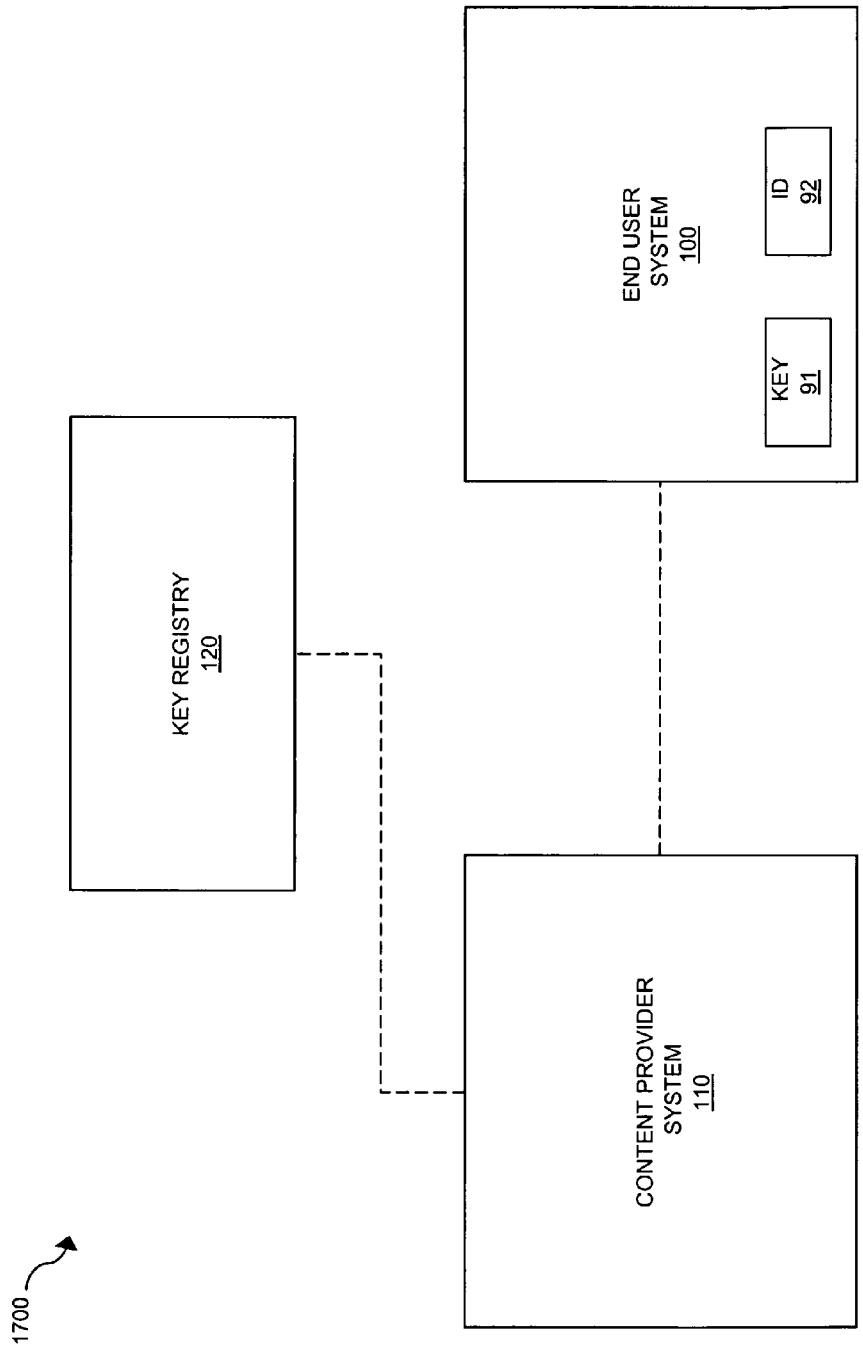
FIG. 17 illustrates a communication system in an embodiment of the invention.

FIG. 17 illustrates communication system 1700 in an embodiment of the invention. In this embodiment, communication system 1700 includes end user system 100, content provider system 110, and key registry 120. End user system 100 includes key 91 and identifier 92. Similar to key 91, identifier 92 could be hard coded internally to end user system 100. Key 91 could be one half of an asymmetric key pair, such as the private key of a private and public key pair, or one key of a symmetric key pair, as well as any other type of cryptographic key. Key registry 120 could comprise a database system configured to store device identifiers in association with public keys.

Figure 18:
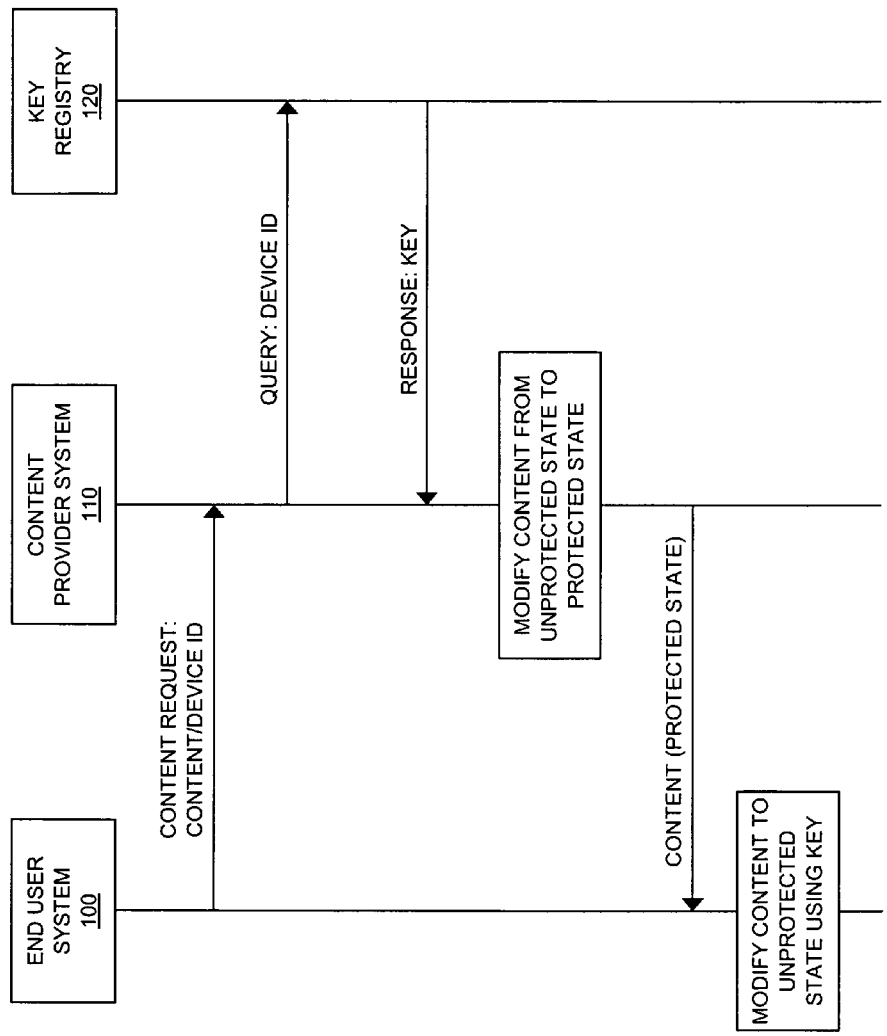
FIG. 18 illustrates the operation of a communication system in an embodiment of the invention.

FIG. 18 is a flow diagram illustrating the operation of communication system 1700 in an embodiment. In this embodiment, end user system 100 transfers a content request to content provider system 110. The content request could indicate specific content and identifier 92. It should be understood that the content request could be transferred by end user system 100. However, it should also be understood that the content request could be placed manually by a user using a different device other than end user system 100. For example, an end user could place a request to content provider system 110 over the phone, through the mail, or from an entirely different system than end user system 100. In such a case, identifier 92 could be known to the user and could be provided to content provider system 110 manually by the user.

Upon receiving the content request, content provider system 110 responsively transmits a query to key registry 120 indicating identifier 92. In this example, it is assumed that key 91 is one half of an asymmetric key pair, although it should be understood that non-asymmetric keys could be used. In response to the query, key registry 120 returns the public key associated with identifier 92. Content provider system 110 modifies the requested content from an unprotected state to a protected state using the public key. For example, content provider system 110 encrypts the content using the public key. Content provider system 110 then transfers the protected content to end user system 100. End user system 100 receives the content and processes the content using key 91 to modify the content from its protected state to an unprotected state. In an example, key 91 is the associated private key of the public key provided by key registry 120.

Figure 19:
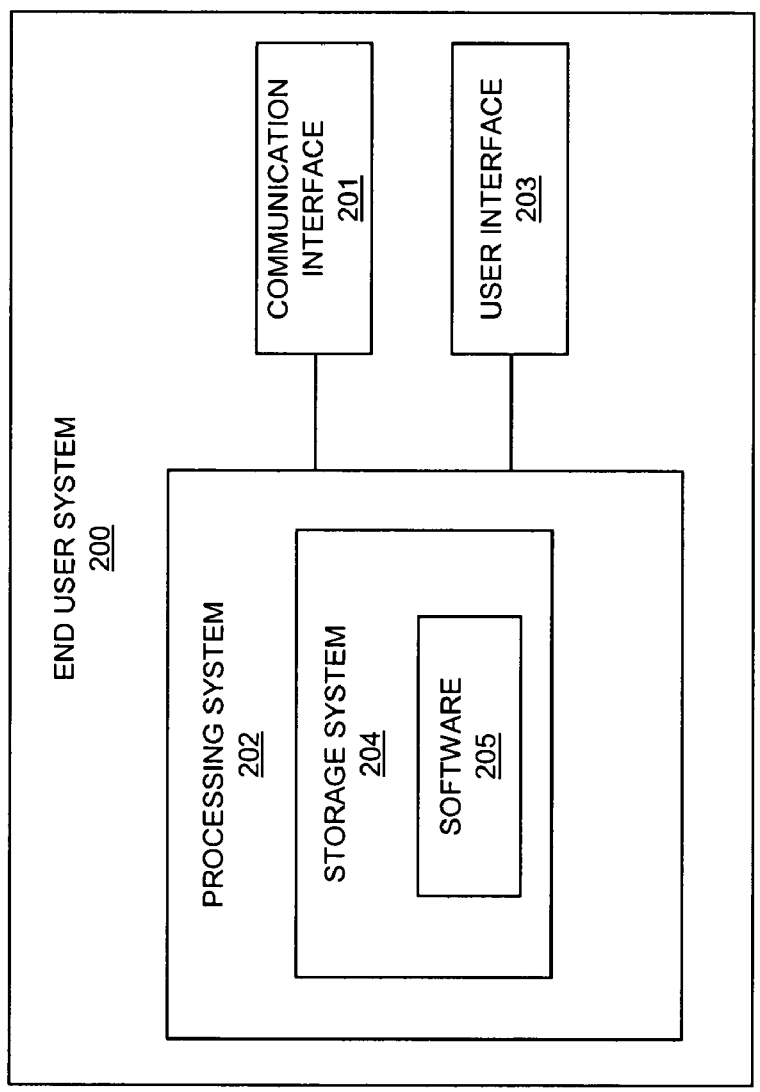
FIG. 19 illustrates an end user system in an embodiment of the invention.

FIG. 19 illustrates end user system 200 in an example of the invention. End user system 200 could represent end user system 100. End user system 200 includes communication interface 201, processing system 202, and user interface 203. Processing system 202 includes storage system 204. Storage system 204 stores software 205. Processing system 202 is linked to communication interface 201 and user interface 203. End user system 200 could be comprised of a programmed general-purpose computer, although those skilled in the art will appreciate that programmable or special purpose circuitry and equipment may be used. End system 200 may use a client server architecture where operations are distributed among a server system and client devices that together comprise elements 201-205. End user system 200 could comprise a combination of networked devices.

Communication interface 201 could comprise an Ethernet interface card, IP port, or some other communication device. Communication interface 201 may be distributed among multiple communication devices. Processing system 202 could comprise a computer microprocessor, logic circuit, or some other processing device. Processing system 202 may be distributed among multiple processing devices. User interface 203 could comprise a keyboard, mouse, voice recognition interface, microphone and speakers, graphical display, touch screen, or some other type of user device. Storage system 204 could comprise a disk, tape, integrated circuit, server, or some other memory device. Storage system 204 may be distributed among multiple memory devices.

Processing system 202 retrieves and executes software 205 from storage system 204. Software 205 may comprise an operating system, utilities, drivers, networking software, and other software typically loaded onto a general-purpose computer. Software 205 could comprise an application program, firmware, or some other form of machine-readable processing instructions. When executed by processing system 202, software 205 directs processing system 202 to operate as described above for end user system 100, and in particular, for communication interface process 101, content process 102, and user interface process 103.

Figure 20:
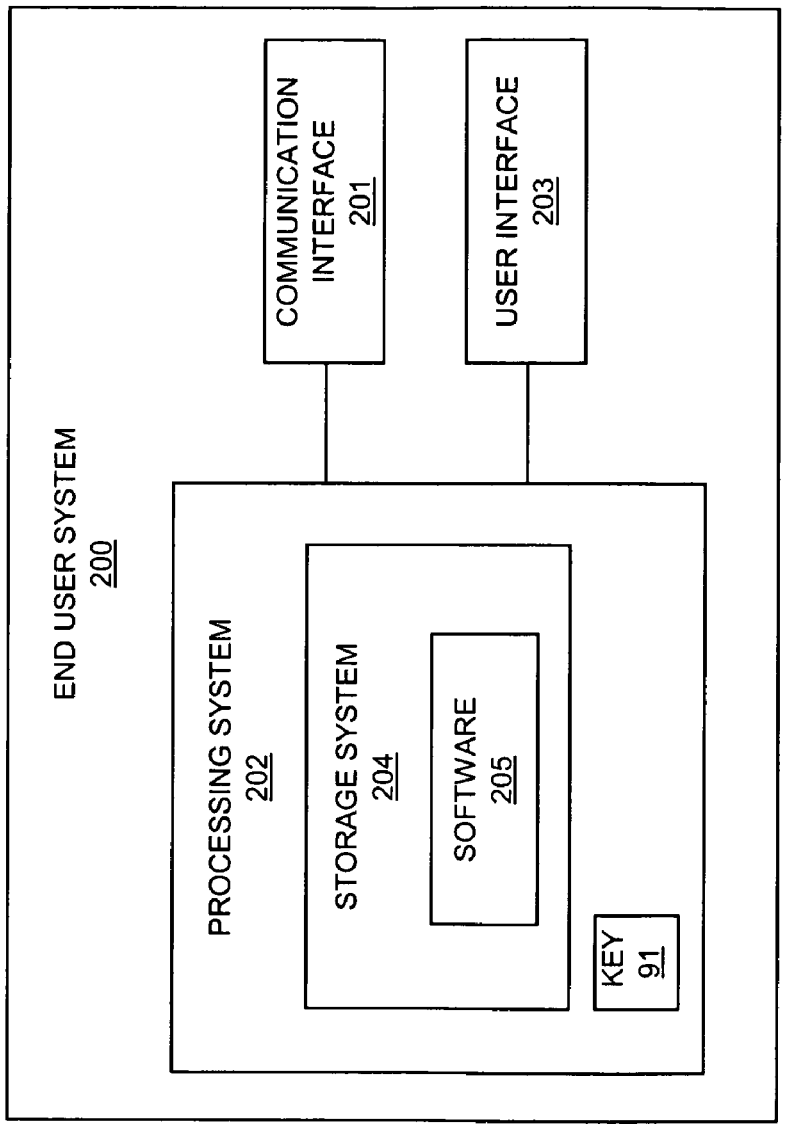
FIG. 20 illustrates an end user system in an embodiment of the invention.

FIG. 20 further illustrates end user system 200 in an embodiment. In this embodiment, end user system 200 includes key 91 internally hard coded to processing system 202. Key 91 could be, for example, deposited on an integrated circuit of processing system 202 during the integrated circuit manufacturing process. In such a case, multiple integrated circuit masks could have unique keys recorded on the masks for later implementation on multiple integrated circuit, each circuit having one key respectively. Key 91 could comprise a binary code in the form of electrical inputs, such as voltage, current, resistance, or capacitance inputs. Other types of inputs are possible, such as pins or fuses. In another example, key 91 could be implemented as programmable read-only memory (PROM) or as erasable programmable read-only memory (EPROM). Other types of internally hard coded keys are possible.

As illustrated by the embodiments discussed above, digital content protection is improved by providing an end user system having an internally hard coded key. In this manner, a remote modification process initially places digital content in a protected state. The content is then transferred to an end user system and returned to an unprotected and useful state using another modification process and the hard coded key. By hard coding the key internally to an end user system, content is physically restricted to the particular end system that contains a key capable of returning the content from a protected state to an unprotected and useful state.

The invention claimed is:

1. A communication system comprising:
a computer system configured to receive a content request indicating content and a device identifier, determine a first key based on the device identifier, process the content using the first key to modify the content from an unprotected digital state to a protected state, and transfer the content in the protected state; and
an end user system comprising a user interface configured to receive the content in the protected state and output the content to a user in an analog form;
wherein the user interface comprises a digital to analog conversion (DAC) process, wherein the DAC process is configured to process the content in the protected state with a second key hard coded internally to the user interface to modify the content from the protected state to the unprotected digital state, and convert the content in the unprotected digital state to the analog form.

2. The communication system of claim 1 wherein the end user system transmits the content request to the computer system and wherein the device identifier is internally hard coded to the end user system.

3. The communication system of claim 1 wherein the first key comprises a public key and the second key comprises a private key corresponding to the public key.

4. The communication system of claim 1 wherein the computer system compresses the content, modifies the content to the protected state after compressing the content, and transfers the content in the protected state to the end user system.

5. The communication system of claim 4 wherein the user interface of the end user system processes the content with the second key to modify the content from the protected state to the unprotected digital state and decompresses the content after modifying the content from the protected state to the unprotected digital state.

6. The communication system of claim 1 wherein the computer system modifies the content to the protected state, compresses the content after modifying the content to the protected state, and transfers the content in the protected state to the end user system.

7. The communication system of claim 6 wherein the user interface of the end user system decompresses the content and modifies the content from the protected state to the unprotected digital state after decompressing the content.

8. The communication system of claim 1 wherein the protected state comprises an encrypted state and wherein the unprotected digital state comprises an unencrypted state.

9. A method of operating a communication system, the method comprising:
in a computer system receiving a content request indicating content and a device identifier, determining a first key based on the device identifier, processing the content using the first key to modify the content from an unprotected digital state to a protected state, and transferring the content in the protected state; and
in an end user system comprising a user interface, receiving the content in the protected state and providing the content to a user in an analog form;
wherein the user interface comprises a digital to analog conversion (DAC) process, and wherein, in the DAC process, processing the content in the protected state with a second key hard coded internally to the user interface to modify the content to the unprotected digital state, and converting the content from the unprotected digital state to the analog form.

10. The method of claim 9 further comprising in the end user system transmitting the content request to the computer system wherein the device identifier is internally hard coded to the end user system.

11. The method of claim 9 wherein the first key comprises a public key and the second key comprises a private key corresponding to the public key.

12. The method of claim 9 further comprising in the computer system compressing the content, modifying the content to the protected state after compressing the content, and transferring the content in the protected state to the end user system.

13. The method of claim 12 further comprising, in the user interface of the end user system, processing the content with the second key to modify the content from the protected state to the unprotected digital state and decompressing the content after modifying the content from the protected state to the unprotected digital state.

14. The method of claim 9 further comprising in the computer system modifying the content to the protected state, compressing the content after modifying the content to the protected state, and transferring the content in the protected state to the end user system.

15. The method of claim 14 further comprising, in the user interface of the end user system, decompressing the content and modifying the content from the protected state to the unprotected digital state after decompressing the content.

16. The method of claim 9 wherein the protected state comprises an encrypted state and wherein the unprotected digital state comprises an unencrypted state.

\* \* \* \* \*